United States Patent
Nederlof et al.

(10) Patent No.: US 10,371,307 B2
(45) Date of Patent: Aug. 6, 2019

(54) TANK OR PIPE HAVING A COATING SYSTEM

(71) Applicant: PPG COATINGS EUROPE B.V., Amsterdam (NL)

(72) Inventors: Arnold Nederlof, Amsterdam (NL); Kees Van Der Kolk, Amsterdam (NL); Arjen Vellinga, Amsterdam (NL); Nathan J. Silvernail, Allison Park, PA (US); Brian C. Okerberg, Gibsonia, PA (US)

(73) Assignee: PPG Coatings Europe B.V., Amsterdam (NL)

( * ) Notice: Subject to any disclaimer, the term of this patent is extended or adjusted under 35 U.S.C. 154(b) by 0 days.

(21) Appl. No.: 15/033,493

(22) PCT Filed: Oct. 30, 2014

(86) PCT No.: PCT/EP2014/073396
§ 371 (c)(1),
(2) Date: Apr. 29, 2016

(87) PCT Pub. No.: WO2015/063235
PCT Pub. Date: May 7, 2015

(65) Prior Publication Data
US 2016/0252205 A1    Sep. 1, 2016

(30) Foreign Application Priority Data
Oct. 31, 2013  (EP) .................................... 13191215

(51) Int. Cl.
*F16L 58/10*    (2006.01)
*C09D 5/00*    (2006.01)
*C09D 5/08*    (2006.01)
*C09D 163/00*    (2006.01)

(52) U.S. Cl.
CPC ............ *F16L 58/1009* (2013.01); *C09D 5/00* (2013.01); *C09D 5/084* (2013.01); *C09D 163/00* (2013.01)

(58) Field of Classification Search
CPC ................................................. F16L 58/1009
USPC .......... 138/146, 145, 140, 137, 138, DIG. 6
See application file for complete search history.

(56) References Cited

U.S. PATENT DOCUMENTS

| | | | |
|---|---|---|---|
| 4,115,614 A | 9/1978 | Martin, Jr. | |
| 6,009,912 A * | 1/2000 | Andre | B21C 37/122 138/122 |
| 6,523,615 B2 * | 2/2003 | Gandy | E21B 17/00 138/DIG. 6 |
| 8,557,096 B2 * | 10/2013 | Schmidt | C23C 22/34 148/247 |

(Continued)

FOREIGN PATENT DOCUMENTS

WO    2008094652 A2    8/2008

*Primary Examiner* — Craig M Schneider
*Assistant Examiner* — David R Deal
(74) *Attorney, Agent, or Firm* — Alicia M. Passerin, Esq.; Christopher J. Owens, Esq.

(57) ABSTRACT

A tank or a pipe having an internal steel surface, at least a portion of the internal steel surface comprising a coating system. The coating system being formed of an overcoat layer and an overcoat-enhancing layer, the overcoat-enhancing layer being interposed between the steel surface and the overcoat layer. In use, the overcoat-enhancing layer enhances the chemical resistance of the overcoat layer to aggressive cargo types.

7 Claims, 1 Drawing Sheet

(56) References Cited

U.S. PATENT DOCUMENTS

| | | | | |
|---|---|---|---|---|
| 8,574,392 B2* | 11/2013 | Prenzel | ............... | B05D 1/286 |
| | | | | 156/307.7 |
| 8,709,200 B2* | 4/2014 | Mussig | ............... | B32B 15/08 |
| | | | | 156/309.6 |
| 9,163,739 B2* | 10/2015 | Hunter | ............... | F16K 3/36 |
| 9,284,460 B2* | 3/2016 | Vonk | ............... | C09D 7/60 |
| 9,534,301 B2* | 1/2017 | Brouwer | ............... | C23C 22/364 |
| 9,970,115 B2* | 5/2018 | Vonk | ............... | C23C 22/34 |
| 2008/0187667 A1* | 8/2008 | Hennessey | ............... | B05D 1/06 |
| | | | | 427/299 |
| 2008/0302448 A1* | 12/2008 | Frey | ............... | B05D 7/14 |
| | | | | 148/274 |
| 2010/0285334 A1 | 11/2010 | Lingenfelter et al. | | |
| 2012/0183806 A1* | 7/2012 | McMillen | ............... | C23C 22/34 |
| | | | | 428/656 |
| 2012/0270968 A1* | 10/2012 | Mao | ............... | C09D 5/08 |
| | | | | 523/442 |
| 2013/0206756 A1* | 8/2013 | Niederst | ............... | B05D 7/227 |
| | | | | 220/62.12 |

* cited by examiner

TANK OR PIPE HAVING A COATING SYSTEM

The present invention relates to a tank or pipe having a coating system applied to at least part of an internal surface. The invention also extends to tanks or pipes comprising coating systems having improved chemical resistance, especially for use in the chemical storage and transport industry. The invention further extends to the use of an overcoat-enhancing layer to increase the chemical resistance of an overcoat layer.

Containers used in processing, storing, handling or transporting products and chemicals in the chemical storage and transport industry will commonly comprise coating systems applied to the internal surfaces. Such container or processing equipment may include pipe internals, on- and offshore storage tanks, ship tanks, potable water tanks, ballast tanks etc.

The coating systems are often formed from organic or inorganic materials such as epoxy-, silicate-, polyurea, polyurethane, vinyl ester, polyolefin systems or combinations of such technologies. The coated surfaces will commonly be formed of steel. During use, the coated surfaces face long term exposure to the liquid phase or vapour phase of crude or refined products and chemicals such as acids, alkaline, oils, fats, solvents (like alcohols, ketones, ethers, hydrogenated hydrocarbons), and water.

The coatings face demanding specifications in order to fulfill requirements in the chemical tank coating market. For example, operational efficiency (quicker change of cargoes, shorter recovery time, early water washing), increasing cargo temperatures (e.g. fatty acids for pumpability), higher levels of aggressive contaminations (alkaline/acid conditions etc), and cargo/water flushing sequences put high demands on tank coating performance and lifetime.

Current coating systems in this field can suffer from a number of problems and restrictions in use, such as short lifetime, inconsistent behaviour, degradation due to repeated cyclic transport of aggressive cargoes, narrow operating temperature ranges, suitability for only a narrow range of cargo types, a long interval for coating recovery after off-loading and/or strict requirements for ventilation.

It is therefore an object of aspects of the present invention to address one or more of the above mentioned or other problems.

According to first aspect of the present invention, there is provided a tank or a pipe having an internal steel surface, at least a portion of the internal steel surface comprising a coating system, the coating system comprising an overcoat layer and an overcoat-enhancing layer, the overcoat-enhancing layer being interposed between the steel surface and the overcoat layer, and wherein the overcoat-enhancing layer enhances the chemical resistance of the overcoat layer.

According to another aspect of the present invention, there is provided a tank or pipe containing a chemically aggressive liquid, solid or semi-solid, the tank or pipe having an internal steel surface, at least a portion of the internal steel surface comprising a coating system, the coating system comprising an overcoat layer and an overcoat-enhancing layer, the overcoat-enhancing layer being interposed between the steel surface and the overcoat layer, and wherein the overcoat-enhancing layer enhances the chemical resistance of the overcoat layer toward the said liquid, solid or semi-solid.

Advantageously, it has surprisingly been found that the present invention provides tanks and pipes with improved performance. In particular, the present invention provides improved performance of overcoat layers in areas such as improved anti-corrosive properties, adhesion, impact resistance, heat resistance, crack resistance, and/or chemical resistance performance.

Accordingly, tank or pipe coating systems and tanks or pipes coated with the coating system according to the present invention may display improved lifetime expectancy, robustness, operational efficiency (reduced coating reconditioning between cargoes, reduced ventilation times, less stringent restrictions in service), acceptance of higher cargo temperatures, and increased cargo versatility. The improved chemical resistance provided by the present invention also allows for greater tolerance in raw material variation, thus allowing for the use of more cost effective raw materials, paint production (dosing of raw materials, processing parameters), paint application (tolerance in mixing, film thickness), and curing, and also improving resistance during cargo/water flushing sequences, even with direct water exposure after cargo off-loading.

According to another aspect of the present invention, there is provided a tank or pipe coating system for application to at least a portion of an internal steel surface of a tank or pipe, the coating system comprising an overcoat layer and an overcoat-enhancing layer, the overcoat-enhancing layer being interposed between the steel surface and the overcoat layer, and wherein the overcoat-enhancing layer enhances the chemical resistance of the overcoat layer.

According to another aspect of the present invention, there is provided the use of an overcoat-enhancing layer to increase the chemical resistance of a coating system, preferably the overcoat of a coating system, wherein the coating system comprises an overcoat-enhancing layer interposed between a steel substrate and an overcoat layer.

According to another aspect of the present invention, there is provided the use of an overcoat-enhancing layer to increase the chemical resistance a coating system, preferably of an overcoat in a coating system, against long term exposure to, and/or repeated cycling of, chemicals, wherein the coating system comprises an overcoat-enhancing layer interposed between a steel substrate and an overcoat coating layer.

According to another aspect of the present invention, there is provided a method of increasing the chemical resistance of an overcoated steel surface, the method comprising interposing an overcoat-enhancing layer between the steel surface and the overcoat coating layer.

The overcoat-enhancing layer may comprise any suitable material. Preferably, the overcoat-enhancing layer comprises compositions based on a group IIIB or IVB metal compound from the periodic table of elements, silane compounds, metal alkoxides, zinc phosphate or mixtures thereof. More preferably, zirconium or silane compounds, or mixtures thereof.

In one embodiment, the overcoat enhancing layer may comprise compositions based on a group IIIB or IVB metal compound, silane compound, or mixtures thereof, such as a zirconium or silane compound. Suitably, an acidic metal fluoro complex, such as an acidic group IIB or IVB metal fluoro complex, for example an acidic zirconium fluoro complex.

Commercially available compositions suitable for forming an overcoat-enhancing layer include Zircobond 4200SM/SR (available from PPG Industries), and Nanomyte PT-20 (available from NEI Corporation).

The overcoat enhancing layer may be applied to the steel surface of the tank or pipe using any known suitable application method. For example, the overcoat enhancing layer may be applied by dip coating; spray application (such as by a mist coat with full wetting of the substrate and air drying with ventilation and increased temperature to help water evaporation); pre-treated grit blast material (such as involving treatment of the blasting material with a pre-treatment solution and transfer of the pre-treatment layer from the grit blasting material to the steel substrate). Advantageously, the pre-treated grit blast method of application provides improved efficiency because blasting and pre-treatment is performed in one action. Other methods include wet slurry blasting (such as a combination of grit blasting material with a pre-treatment solution); hydrojetting with a pre-treatment solution; sponge grit, (such as where grit material is coated with a sponge-like material that can be wetted with a pre-treatment solution), and/or hosing.

Preferably, the thickness of the overcoat-enhancing layer is substantially between 10 nm to 2 μm. More preferably, the thickness of the overcoat-enhancing layer substantially is between 10-300 nm, more preferably still between 10-100 nm, most preferably 20 to 70 nm. The film thickness of the over-coat enhancing layer may be measured with XRF-equipment (X-ray fluorescence spectrometry).

The overcoat layer may comprise any suitable material for tank and pipe coating systems. The overcoat layer may be organic or inorganic in nature. Preferably, the overcoat layer comprises epoxy, silicate, polyurethane, polyurea, vinyl esters or combinations thereof. Most preferably, the overcoat layer comprises epoxy resin.

Suitably, the overcoat layer is a low temperature application overcoat layer, such as an ambient temperature application overcoat layer. For example, suitably the overcoat layer is applied at a temperature of below 100° C., such as below 80° C. or below 60° C., or below 40° C., or below 30° C. Typically, the overcoat layer is applied at substantially ambient temperature, such as around 18-28° C., such as around 21-24° C.

Suitably, the overcoat layer is a low temperature cured overcoat layer, such as an ambient temperature cured overcoat layer. For example, suitably the overcoat layer is cured at a temperature of below 100° C., such as below 80° C. or below 60° C., or below 40° C., or below 30° C. Typically, the overcoat layer is cured at substantially ambient temperature, such as around 18-28° C., such as around 21-24° C.

Suitable compositions for the formation of an overcoat layer are organic coatings commonly in use for tanks and pipes. The binder systems can be (novolac) epoxy/amine, polyurethane, polyurea, vinyl ester, polyolefins. Examples of commercially available products are SigmaGuard 720 (a solvent based bisphenol A epoxy based amine cured tank coating system) and SigmaGuard CSF650 (a solvent free bisphenol A epoxy based amine cured tank coating system), (both available from PPG Industries).

Preferably, the overcoat layer comprises a single coat of overcoat composition. Optionally, the overcoat layer may comprise two or more coats of overcoat composition. For example, the overcoat layer may comprise 2, 3 or 4 coats of overcoat composition. Each coat of overcoat composition may be the same or different types of overcoat composition.

Currently, overcoats in the chemical storage and transport industry commonly have multiple coats of overcoat, normally 2 or 3 coating layers. Multiple overcoat coats however require relatively long and complicated application processes. Advantageously, the present invention may provide a coating system that comprises a single coat of overcoat composition that has the same or improved properties compared to the currently used multiple coat overcoating systems.

The overcoat layer may have any suitable thickness. For example, an overcoat layer may have a thickness of substantially between 200 to 550 μm. Preferable dry coating thicknesses are from 300 μm for solvent based (multi coat) systems and from 400 μm for solvent free coating (single coat) systems.

Optionally, the overcoat layer may be formed from a substantially volatile organic solvent free overcoat composition.

Currently, coating systems in the chemical storage and transport industry commonly require volatile organic solvent containing overcoating compositions to achieve the required levels of performance. Advantageously, the present invention may provide a more environmentally friendly coating system that comprises an overcoat layer formed from a substantially volatile organic solvent free overcoat composition that has the same or improved properties.

The tank or pipe may be any tank or pipe suitable for use in the chemical storage and transport industry.

The steel material may be any suitable type of steel used for tank and pipe construction. For example, the steel may be hot or cold rolled mild steel. A commercially available example is Ympress Laser E250C from Tata Steel.

The steel surface may be of any quality. For example, at least a portion of the steel surface may be of a quality rated as Sa 1, Sa 2, Sa 2½ or Sa 3 (according to ISO standard 8501-1:2007(E)). Optionally, the present invention allows the quality of the steel surface to be lower than that currently commonly found in the industry. For example, the quality of the steel surface may be Sa2½ or lower, for instance Sa 1 or Sa 2. It is acknowledged in the industry that the profile of the steel is an important factor of influence in the properties of the coating system and especially important for chemical resistant coating. Advantageously, the present invention provides for the enhancement of overcoat properties with the use of a lower quality steel surface to levels equal to or surpassing those found with current systems using higher quality steel surfaces. Thus, costs and process complexity may be reduced.

Preferably, the steel surface has a surface roughness prior to application of the coating system of between 20 to 150 μm, more preferably a surface roughness of between 40 to 100 μm. For examples the steel surface may have an Rz value of 50-65 μm and a peak count of 50-100 counts/cm as measured by Mitutoyo Surface Roughness Tester SJ-201P.

Preferably, the steel surface is grit blasted steel, shot blasted steel, or hydro jetted steel. Most preferably the steel surface is grit blasted steel.

The overcoat-enhancing layer is interposed between the steel surface and an overcoat layer. Preferably, at least a portion of the overcoat-enhancing layer is in substantially direct contact with the overcoat layer. Preferably, at least a portion of the overcoat-enhancing layer is in substantially direct contact with the steel surface. In one embodiment, at least a portion of the overcoat-enhancing layer is in substantially direct contact with the overcoat layer and the steel surface.

The phrases "overcoat-enhancing" and "enhances the chemical resistance of the overcoat layer" when used herein should be interpreted to mean that the interposed overcoat-enhancing layer improves the chemical resistance of the overcoat layer compared to the chemical resistance of the overcoat layer when it is applied to a steel surface without an overcoat enhancing layer interposed therebetween.

The overcoat-enhancing layer may increase the chemical resistance of an overcoat layer against any known aggressive chemical cargo, whether liquid, semi-solid or solid cargo. In particular, the overcoat-enhancing layer may increase the chemical resistance of an overcoat layer against cargos comprising one or more of (in)organic acids, fatty acids, alkalines, solvents, hot water, and cyclic exposures/subsequent exposures to different chemicals (including water). Examples may include increasing the chemical resistance against one or more of the cargoes (demineralised) water, methanol, fatty acids (e.g. capric acid, palm fatty acid), sodium hydroxide solutions, vinyl acetate monomer, and methyl ethyl ketone.

According to another aspect of the present invention, there is provided the use of an overcoat-enhancing layer to increase chemical resistance of a coating system, preferably of an overcoat in a coating system, against long term exposure to, and/or repeated cycling of, chemicals at elevated temperature and/or pressure, wherein the coating system comprises an overcoat-enhancing coating layer interposed between a steel substrate and an overcoat coating layer.

Elevated temperatures are often used for loading/off-loading of cargoes to improve the pumpablity and speed of loading/off-loading. The temperature range depends on the type of cargo, for example to achieve a suitable viscosity of the cargo. The present invention may enhance the chemical resistance of an overcoat layer over a range of elevated operating temperatures.

Further, the overcoat-enhancing layer may enhance the chemical resistance of an overcoat layer over temperature cycles, such as repeated temperature cycles from a low operating temperature to a high operating temperature.

In the chemical storage and handling industry containers are often subject to elevated operating temperatures and/or pressures, and repeated cycling of these variables during movement, storage and processing of cargo. Advantageously, the present invention provides increased properties upon subjection to these conditions compared to currently known systems.

For a better understanding of the invention, and to show how embodiments of the same may be carried into effect, reference will now be made, by way of example, to the following experimental data and figures, in which.

EXAMPLES

The following materials and coating compositions were prepared, applied and tested as follows.

The substrates used were steel panels (Ympress® Laser E250C from Tata Steel) that had been grit blasted to Sa2½ with a roughness of Rz=50-65 μm.

The composition used to form the overcoat enhancing layers was Zircobond® 4200SM (from PPG Industries).

Application Method of the Overcoat Enhancer Layer:

The steel panels were placed into spray cleaning tank and alkaline cleaned by spraying for 1 minute at 60° C. using UTEC 812 at 2% by volume. The panels were then subjected to a deionized water immersion dip followed by a deionized water immersion spray. The panels were then placed immediately into a overcoat enhancing composition containing spray tank whilst still wet. The panels were then sprayed for 2 minutes at 26.6° C. with the overcoat enhancing composition. The panels were then subject to a deionized water spray rinse, followed by several minutes of forced hot air drying.

Application method for the SigmaGuard 720 (straight epoxy/amine cured solvent based tank coating system, from PPG industries) overcoat layer:

The overcoat enhancing layer treated panels were subjected to air spray application of the overcoat layer at 20-23° C. Two overcoats of 125 μm dry film thickness were applied with an overcoating interval of 2 days. The overcoat layers were cured for 3 weeks at 20-23° C. The non-treated panels of the comparative examples were overcoated in the same manner.

Application method for the SigmaGuard CSF650 (straight epoxy/amine cured solvent based tank coating system, from PPG Industries) overcoat layer:

The overcoat enhancing layer treated panels were subjected to air spray application of the overcoat layer at 20-23° C. The base paint was pre-heated to 60° C. to facilitate spray application. A one coat system of 375-450 μm dry film thickness was applied. The overcoat layers were cured for 2 weeks at 20-23° C. The non-treated panels of the comparative examples were overcoated in the same manner.

Tests

The coated panels were continuously exposed to methyl ethyl ketone (technical grade, available from Acros Organics (article number 444170050) at 40° C. for 6 months. The lower parts of the panels were exposed to methyl ethyl ketone in liquid form, and the upper part of the panels were exposed to methyl ethyl ketone in vapour form.

Results

TABLE 1

Results after 6 months continuous chemical resistance testing

| Example Number | Overcoat enhancing layer | Overcoat layer | Methyl ethyl ketone 40° C. |
|---|---|---|---|
| Example 1 | Zircobond ® 4200SM | SigmaGuard 720 | OK, no defect |
| Example 2 | Zircobond ® 4200SM | SigmaGuard CSF650 | OK, no defect |
| Comparative example 1 | None | SigmaGuard 720 | Fail, severe blistering in 2 weeks, mainly in liquid exposed area |
| Comparative example 2 | None | SigmaGuard CSF650 | Fail, severe blistering in 2 weeks |

Figure 1:
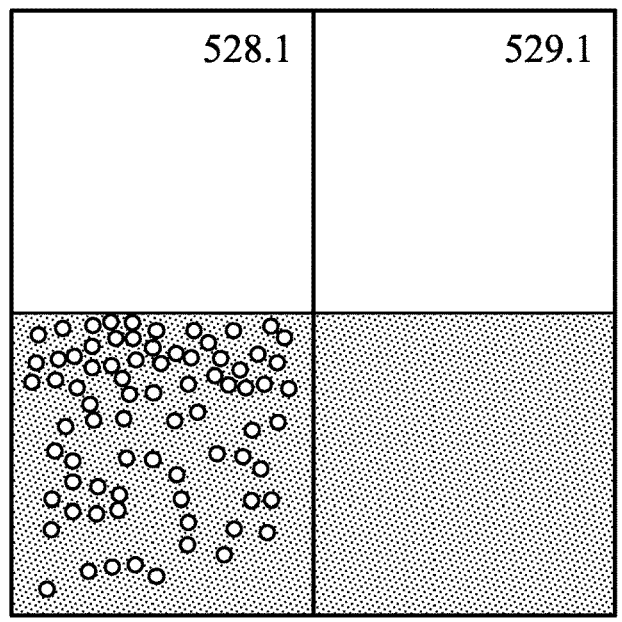
FIG. 1 shows a photograph of two coated panels, the left-hand coated panel comprising a comparative coating system and the right-hand coated panel comprising a coating system according to the present invention.

Referring firstly to FIG. 1, there is shown two coated panels after testing. The left-hand coated panel (labelled 528-1) comprises a comparative coating system according to comparative example 1 and the right-hand coated panel (labelled 529-1) comprises a coating system according to example 1. The panels were tested according to the above-mentioned testing procedure. The left-hand panel suffered from blistering within 2 weeks, as shown by the plurality of raised domes on the surface of the panel exposed to the liquid. The panel also suffered from rippling on the surface of the panel that was exposed to the vapour. In contrast, the surface of the right-hand panel remained intact for 6 months, as shown by the flat surface of the panel.

Figure 2:
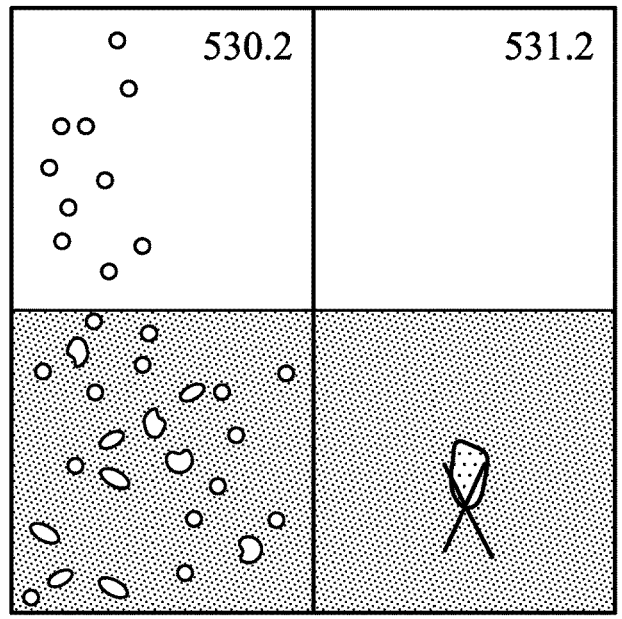
FIG. 2 shows a photograph of two coated panels, the left-hand coated panel comprising a comparative coating system and the right-hand coated panel comprising a coating system according to the present invention.

Referring now to FIG. 2, there is shown two coated panels after testing. The left-hand coated panel (labelled 530-2) comprises a comparative coating system according to comparative example 2 and the right-hand coated panel (labelled 531-2) comprises a coating system according to example 2.

The panels were tested according to the abovementioned testing procedure. The left-hand panel suffered from severe blistering within 2 weeks in both the liquid and vapour exposed region of the panel, as shown by the plurality of raised domes across the surface of the panel. In contrast, the surface of the right-hand panel remained intact for 6 months, as shown by the flat surface of the panel. The small non-coated region on the right hand panel, located toward the centre of the bottom half of the panel was intentionally removed by hand using a knife after testing.

The above experimental results show chemical immersion testing of an overcoat enhancement layer in combination with different types of overcoat, resulting in improved chemical resistance. As shown in table 1 and the figures, inventive examples 1 and 2 show improved resistance when exposed to methyl ethyl ketone.

It has further been found that the inventive coating system also shows improved chemical resistance to a range of cargo types. The inventive coating system has also shown improved performance after cycling, and after cycling with varying cargo temperatures.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A tank or a pipe having an internal steel surface, wherein at least a portion of the internal steel surface comprises a coating system, the coating system comprising:
    a. an overcoat layer comprising epoxy, silicate, polyurethane, polyurea, and/or vinyl esters; and
    b. an overcoat-enhancing layer having a thickness between 10 nm to 2 µm, the overcoat-enhancing layer comprising a composition based on a group IIIB or IVB metal compound from the periodic table of elements, silane compound, metal alkoxide, zinc phosphate or mixtures thereof;
    wherein at least a portion of the internal steel surface has a surface roughness prior to the application of the coating system of 20 µm to 150 µm;
    the overcoat-enhancing layer being interposed between the internal steel surface and the overcoat layer, wherein the internal steel surface comprising the coating system is flat compared to an internal steel surface having the overcoat layer but not the overcoat-enhancing layer following exposure of the internal steel surface comprising the coating system and the internal steel surface having the overcoat layer but not the overcoat-enhancing layer to methyl ethyl ketone (40° C., 2 weeks).

2. The tank or pipe according to claim 1, wherein the tank or pipe is configured to hold a liquid, solid or semi-solid.

3. The tank or pipe according to claim 1, wherein the overcoat layer is formed from a single coat of an overcoat composition.

4. The tank or pipe according to claim 1, wherein the overcoat layer is formed from a substantially volatile organic solvent free overcoat composition.

5. The tank or pipe according to claim 1, wherein the steel surface has a level of cleanliness prior to coating of Sa3, Sa2½, Sa2 or Sa1.

6. A tank or pipe coating system for application to at least a portion of an internal steel surface of a tank or pipe, the coating system comprising:
    a. an overcoat layer comprising epoxy, silicate, polyurethane, polyurea, and/or vinyl esters; and
    b. an overcoat-enhancing layer having a thickness between 10 nm to 2 µm, the overcoat-enhancing layer comprising a composition based on a group IIIB or IVB metal compound from the periodic table of elements, silane compound, metal alkoxide, zinc phosphate or mixtures thereof;
    wherein at least a portion of the internal steel surface has a surface roughness prior to the application of the coating system of 20 µm to 150 µm;
    the overcoat-enhancing layer being interposed between the internal steel surface and the overcoat layer, wherein the internal steel surface comprising the coating system is flat compared to an internal steel surface having the overcoat layer but not the overcoat-enhancing layer following exposure of the internal steel surface comprising the coating system and the internal steel surface having the overcoat layer but not the overcoat-enhancing layer to methyl ethyl ketone (40° C., 2 weeks).

7. A method of increasing the chemical resistance of an overcoated steel surface, the method comprising interposing an overcoat-enhancing layer comprising a composition based on a group IIIB or IVB metal compound from the periodic table of elements, silane compound, metal alkoxide, zinc phosphate or mixtures thereof and having a thickness between 10 nm to 2 µm between a steel surface and an overcoat coating layer comprising epoxy, silicate, polyurethane, polyurea, and/or vinyl esters, wherein at least a portion of the steel surface has a surface roughness prior to the interposing of the overcoat-enhancing layer of 20 µm to 150 µm.

* * * * *